United States Patent [19]

Pruett

[11] Patent Number: 5,143,207

[45] Date of Patent: Sep. 1, 1992

[54] TENSION CONTROLLING AND SHOCK ABSORBING APPARATUS FOR AN ENDLESS CONVEYOR

[75] Inventor: David M. Pruett, Canon City, Colo.

[73] Assignee: Portec, Inc., Oak Brook, Ill.

[21] Appl. No.: 712,087

[22] Filed: Jun. 6, 1991

[51] Int. Cl.[5] ............................................. B65G 23/44
[52] U.S. Cl. ....................................... 198/814; 198/831
[58] Field of Search ................. 198/813, 814, 816, 831

[56] References Cited

U.S. PATENT DOCUMENTS

| | | |
|---|---|---|
| 3,217,861 | 11/1965 | Daniluk et al. . |
| 3,237,754 | 4/1966 | Freitag, Jr. et al. . |
| 3,648,823 | 3/1972 | Neer ................................. 198/814 X |
| 3,718,197 | 2/1973 | Barten et al. .................... 198/814 X |
| 4,269,302 | 5/1981 | Garvey ............................ 198/814 X |
| 4,930,621 | 6/1990 | Brown et al. . |
| 4,995,506 | 2/1991 | Langenbacher et al. ............ 198/814 |

FOREIGN PATENT DOCUMENTS 1221095  3/1986  U.S.S.R. ............................... 198/814

OTHER PUBLICATIONS

McMaster-Carr Brochure *Disc Springs & Spring Reels.*

*Primary Examiner*—Joseph E. Valenza
*Assistant Examiner*—Tuan N. Nguyen
*Attorney, Agent, or Firm*—Joseph J. Kelley

[57] ABSTRACT

Apparatus wherein an endless moving conveyor belt is trained around two spaced apart shafts and wherein at least one of the shafts is mounted in a bearing that is resiliently urged in a direction away from the other shaft to provide the proper tension in the endless moving conveyor belt, and shock absorbing apparatus is provided for absorbing excessive forces placed on the bearing with or without the resilient urging of the bearing.

17 Claims, 2 Drawing Sheets

5,143,207

TENSION CONTROLLING AND SHOCK ABSORBING APPARATUS FOR AN ENDLESS CONVEYOR

FIELD OF THE INVENTION

This invention is directed generally to the field of endless conveyors wherein an endless conveyor belt is journaled around a pair of spaced apart shafts and which is used to move articles from one location to another location and more particularly to apparatus for applying a force to at least one of the shafts to control the tension in the endless conveyor belt and for absorbing excessive forces placed on the at least one of the shafts.

BACKGROUND OF THE INVENTION

In apparatus using endless moving conveyor belts for carrying articles from one location to another location, it is conventional to have the endless moving conveyor belt trained around spaced apart shafts and to have means for adjusting the location of at least one of the shafts to provide for the proper tension in the endless moving conveyor belt. Examples of such means is disclosed in U.S. Pat. Nos. 3,217,861; 3,237,754 and 4,930,621. While these means function as disclosed, it is necessary to readjust them to compensate for wear and other changes in the endless moving conveyor belt. Therefore, it has been desirable for some type of apparatus to maintain the proper tension in an endless moving conveyor belt particularly during the operation thereof. Also, it is desirable to provide shock absorbing means to absorb the torque placed on the endless moving conveyor belt during start up which torque can be as high as 350% greater than the running torque.

BRIEF DESCRIPTION OF THE INVENTION

This invention provides apparatus for maintaining the proper tension in an endless moving conveyor belt particularly during the operation thereof and to shock absorbing means associated with the tension apparatus for absorbing the relatively high torques resulting at the beginning of movement of the endless moving conveyor belt.

In a preferred embodiment of the invention, bearing means are provided for mounting at least a pair of rotatable shafts on the main fixed frame of the conveying apparatus so that an endless conveyor belt may be trained therearound. Drive means are provided for rotating at least one of the shafts to move the endless conveyor belt. Mounting means are provided for mounting at least one of the bearing means for sliding movement relative to the main fixed frame. The mounting means comprises a bearing support plate which is fixedly attached to the main fixed frame. At least a pair of spaced apart bearing slides are mounted on the bearing support plate so that the bearing slides are spaced outwardly from the bearing support plate. A bearing block is provided for holding at least one of the bearing means and the bearing block has at least one support surface for supporting the bearing block for sliding movement over at least one of the bearing slides. Spaced apart guide surfaces are provided on the bearing block for cooperation with the bearing slides for guiding the movement of the bearing block over the at least one of the bearing slides. Force applying means are provided for applying a force on the mounting means to maintain the proper tension in the endless conveyor belt. The force applying means comprise a support base which is secured on the bearing support plate and projects outwardly therefrom. The support base has a pair of spaced apart threaded openings therein having parallel longitudinal axes. Resilient means are provided for applying the force on the mounting means and comprise a body portion that is threadedly mounted in the spaced apart threaded openings so that the body portion may be adjusted relative to the support base. Locking means, such as a set screw, prevent relative movement between the body portion and the support base. A plunger is mounted in each body portion and resilient means are provided to urge the plunger out of each body portion so that the end surfaces thereof contact the mounting means to apply the force thereto. A slot is formed in the bearing support plate to allow for the sliding movement of at least one of the shafts.

Shock absorbing means are provided for absorbing the excessive forces produced by the torque on the endless conveyor belt at the beginning of movement thereof. The shock absorbing means comprise one or more belleville springs which are slidably mounted on each of the plungers and located between the end surfaces of the plungers and the end surfaces of the body portions. When the endless conveyor belt is not moving, there is a clearance of about 0.000 to 0.075 inch to permit slight movement of the mounting means before the one or more belleville springs will be in contact with the end surface of the mounting means and the end surfaces of the body portion to begin absorbing the excessive forces. After the movement of the endless conveyor belt has commenced, the plungers will be urge outwardly from the body portions to move the at least one shaft to apply sufficient force to maintain the proper tension on the moving endless conveyor belt.

BRIEF DESCRIPTION OF THE DRAWINGS

Illustrative and presently preferred embodiments of the invention are shown in the accompanying drawings in which.

DETAILED DESCRIPTION OF THE INVENTION

Figure 1:
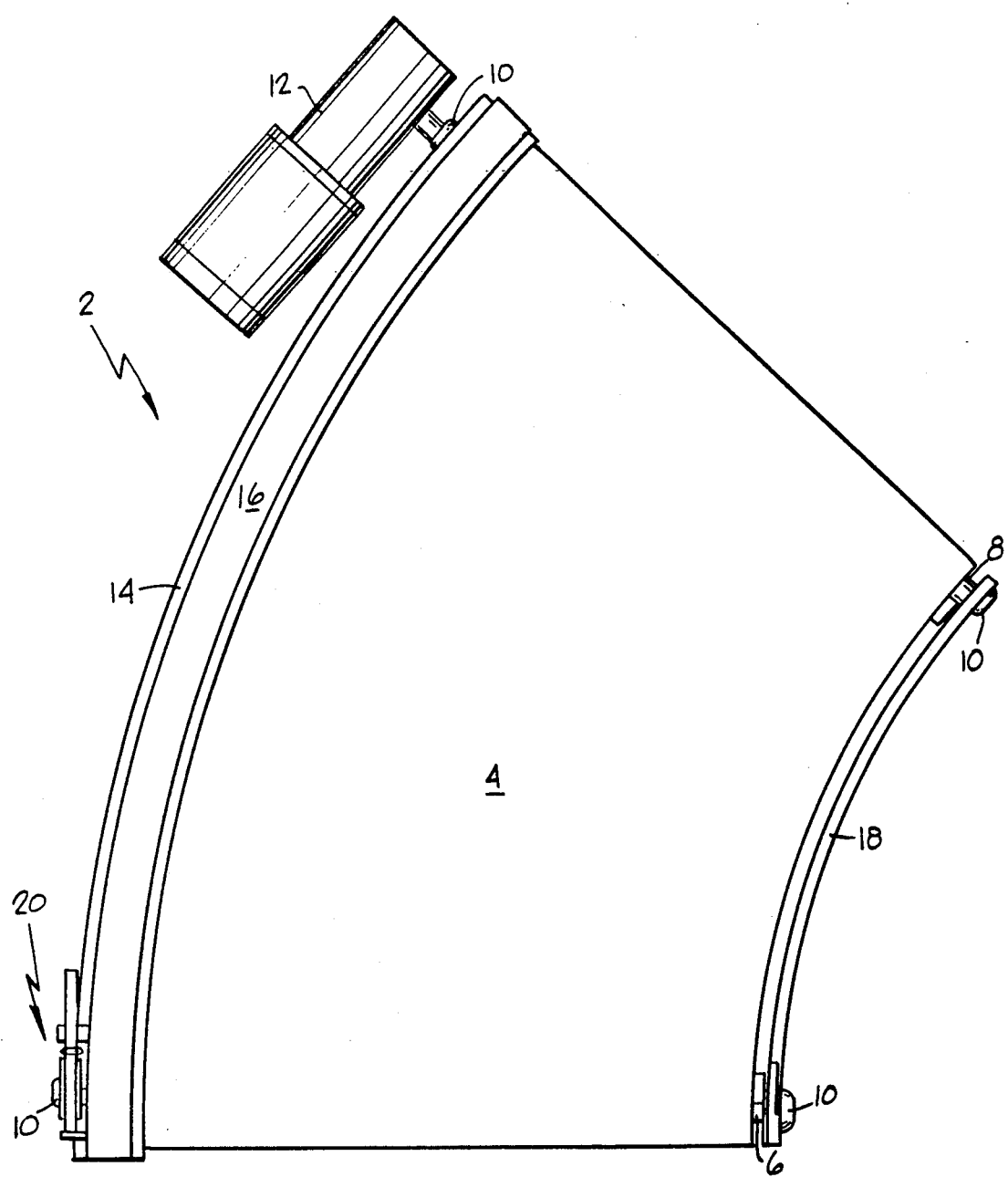
FIG. 1 is a top plan view of a power turn which is part of a conveying system.
Figure 2:
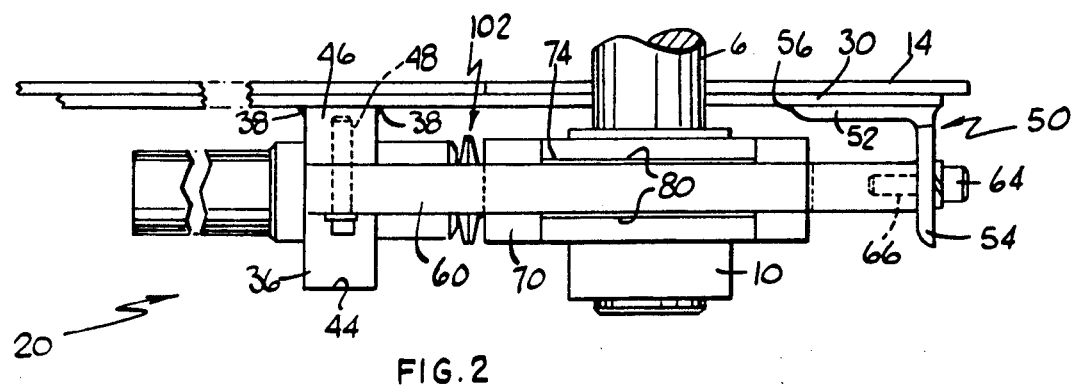
FIG. 2 is an enlarged top plan view of a portion of FIG. 1.
Figure 4:
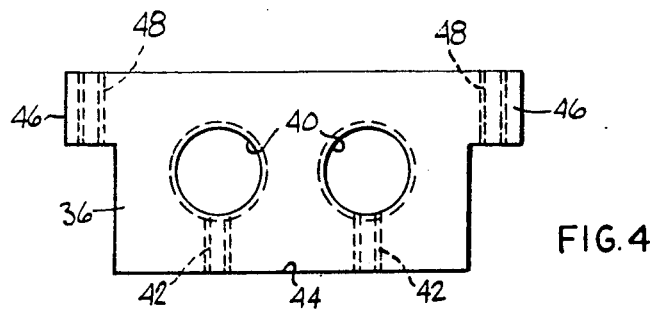
FIG. 4 is an end elevational view of a mounting bracket rotated through ninety degrees.
Figure 5:
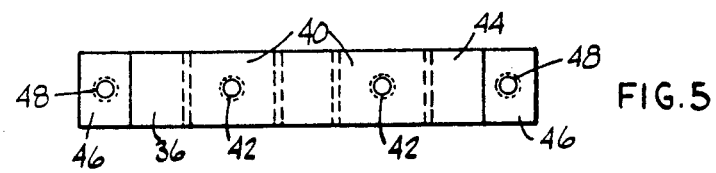
FIG. 5 is a side elevational view of FIG. 4.

In FIG. 1, there is schematically illustrated a forty-five degree power turn 2 wherein an endless conveyor belt 4 is trained around a pair of spaced apart rotatable shafts 6 and 8 which are rotatably mounted in bearings 10. The rotatable shaft 8 is rotated by drive means 12. The power turn 2 has an outer arcuate sidewall 14 having cover means 16 and an inner arcuate sidewall 18. One of the bearings 10 is mounted in apparatus 20 of this invention, described more fully below. While a forty-five degree power turn 2 is illustrated in FIG. 1, it is understood that the apparatus 20 of this invention can be used in any conveyor system using straight conveyors, transfer conveyors or power turns of other degrees.

One preferred embodiment of the apparatus 20 of this invention for maintaining the proper amount of tension in the endless conveyor belt 4 and for absorbing the initial excessive forces resulting from the beginning of movement of the endless conveyor belt 4 is illustrated in FIGS. 2-5. A bearing support plate 30 is mounted on the outer arcuate sidewall 14 using a plurality of headed threaded bolts 34 and locking nuts (not shown). The sidewall 14 is secured to a portion 32 of the fixed frame supporting the power turn 2 by suitable means, such as by welding. A support base 36 is secured to the bearing support plate 30 by suitable means, such as by welding 38. The support base 36 has two internally threaded openings 40 extending therethrough and having parallel longitudinal axes. An internally threaded opening 42 extends between each of the internally threaded openings 40 and an exterior surface 44 of the support base 36. A pair of spaced apart flanges 46 extend outwardly from the support base 36 and each of them has an internally threaded opening 48 extending therethrough. A support bracket 50 comprising a base portion 52 and a flange portion 54 is secured on the bearing support plate 30 by suitable means, such as by welding 56. The flange portion 54 has a pair of spaced apart openings 58 extending therethrough.

A pair of spaced apart bearing slides 60 are mounted on the support base 36 and the support bracket 50 so that they are spaced outwardly from the bearing support plate 30. Each of the bearing slides 60 has a rectangular transverse cross-sectional configuration. Headed threaded bolts 62 pass through openings in each of the bearing slides 60 and are threaded into the internally threaded openings 48 to secure each of the bearing slides 60 to one of the flanges 46. Headed threaded bolts 64 pass through the openings 58 and are threaded into internally threaded openings 66 to secure each of the bearing slides 60 to the flange portion 54. The bearing slides 60 are in parallel relationship.

Figure 3:
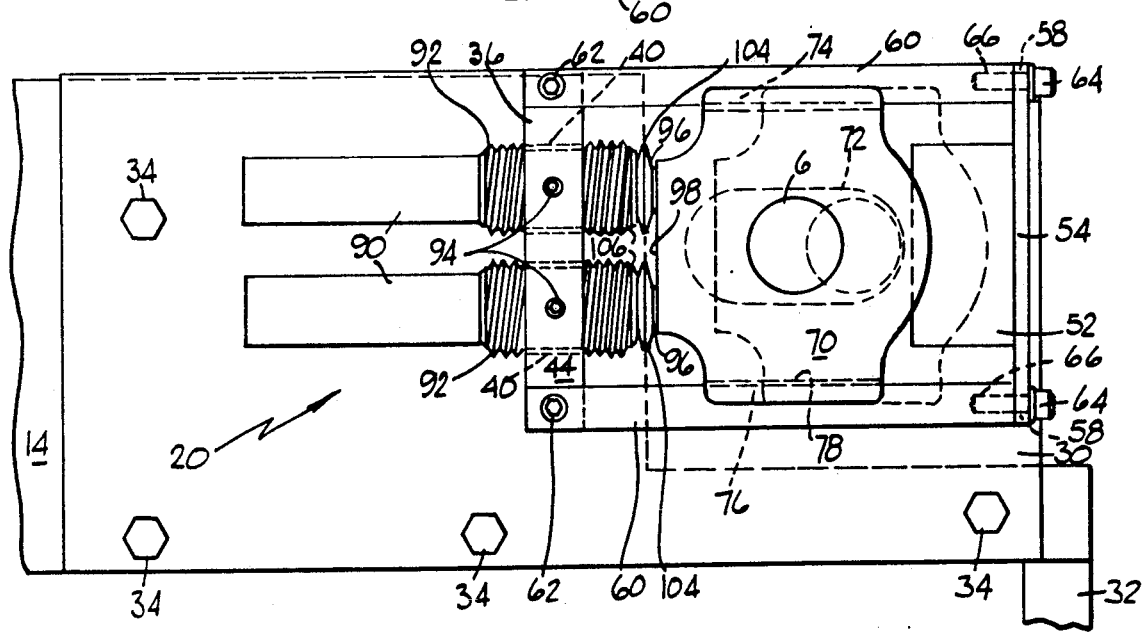
FIG. 3 is a side elevational view of FIG. 2.

The bearing means 10 are mounted in a bearing block 70 which is mounted for sliding movement over the bearing slides 60. In FIG. 3, the bearing means 10 have been removed to illustrate the sliding movement of the shaft 6 in the slot 72 in the bearing support plate 30. An upper recess 74 and a lower recess 76 are formed in the bearing block 70. The lower recess 76 has a support surface 78 for supporting the bearing block 70 for sliding movement over the bearing slide 60. The upper and lower recesses 74 and 76 have guide surfaces 80 for guiding the sliding movement of the bearing block 70.

A pair of resilient force applying means 90, such as those marketed by Vlier, are mounted on the support base 36. Each of the force applying means 90 has an externally threaded body portion 92 that is in threaded engagement with the internally threaded openings 40 so that the axial location of the externally threaded body portion 92 may be adjusted by the rotation thereof. A set screw 94 in each of the internally threaded openings 42 is used to hold the externally threaded body portion 92 at an adjusted location. A plunger 96 is slidably mounted in each externally threaded body portion 92 and is resiliently urged outwardly by spring means (not shown) in the force applying means 90. The normal location of the plunger 96 is in a fully extended position with portions on the plunger 96 and the body portion 92 preventing the ejection of the plunger from the body portion 92. After the resilient force applying means 90 have been mounted, as described below, each plunger 96 abuts against an abutment surface 98 to apply a resilient force on the bearing block 70. The resilient force applied by each of the plungers 96 is between about 16 and 68 pounds which is sufficient to take-up any stretch of the chain and/or belt during operation of the power turn 2.

Shock absorbing means 102 comprising one or more belleville disc springs 104, preferably between about 2 to 4 belleville disc springs in a series relationship, are slidably mounted on each plunger 96. When the power turn 2 is not moving, there is a clearance between the one or more belleville disc springs 104 and the abutment surface 98 and abutment surfaces 106 on the end of each of the externally threaded body portions 92 of less than about 0.075 inch. The forces caused by the start-up of the power turn 2 on the bearing block 70 will move the plungers 96 back into the externally threaded body portions 92 until the one or more belleville disc springs 104 are in contacting relationship with the abutment surface 98 and the abutment surfaces 106. At this time, the one or more belleville disc springs 104 will function to absorb these forces. The forces at startup will be as high as about 350% greater than the normal forces on the shaft 6.

In operation, the externally threaded body portion 92 of the resilient force applying means 90 is engaged with the internally threaded openings 40 of the support base 36, then rotated until the end portion of the plunger 96 extends outwardly from the support base 36 a distance which permits the Belleville disc springs 104 to be slipped over each plunger 96. The rotation of the body portion 92 is continued until each plunger 96 contacts the abutment surface 98. The rotation of the body portion 92 is then continued until the distance between the shock absorbing means 102 and the abutment surface 98 is less than 0.075 inch, preferably about 0.031 inch. The set screws 94 are then tightened. As described above, the one or more belleville disc springs 104 function as shock absorbers at start-up and thereafter the force applying means 90 function to take-up any stretch of the chain and/or the endless conveyor belt 4 during operation. As the distance between the shock absorbing means 102 and the abutment surface 98 exceeds approximately 0.075 inch, the set screws 94 can be loosened, allowing the resilient force applying means 90 to be rotated until the preferred distance of 0.031 is achieved. The set screws 94 are then tightened. In many operations, such as baggage conveyors at air ports, the conveying systems are stopped and started many times during an hour. The tension controlling and shock absorbing apparatus reduces the frequency of stretch and damage to the chain and/or the endless conveyor belt 4 during rapid frequency of starts/stops of operation. In the discussion above, only one apparatus 20 is described at one end of the shaft 6, but it is understood that an apparatus 20 may be located at the other end of the shaft 6.

Figure 6:
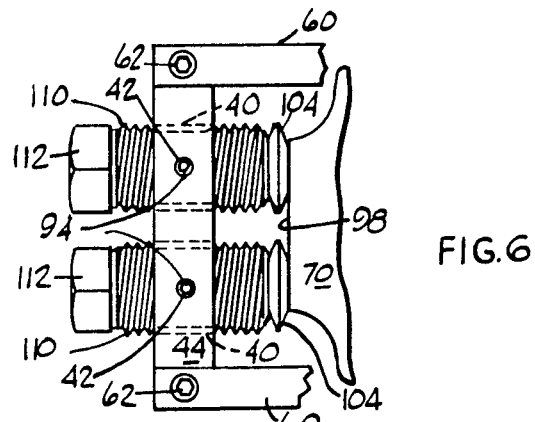
FIG. 6 is a side elevational view of a portion of another embodiment of the invention

Another preferred embodiment of the invention is illustrated in FIG. 6 wherein parts corresponding to those in FIGS. 2-5 have been given the same reference numerals. In FIG. 6, an externally threaded bolt 110 is in threaded engagement with the internally threaded openings 40. The one or more belleville disc springs 104 are secured on the ends of the externally threaded bolts 110 by suitable means, such as by welding (not shown). The externally threaded bolts 110 have head portions 112 to facilitate the rotation thereof.

In operation, the set screws 94 are loosened and the externally threaded bolts 110 are rotated until the one or more belleville disc springs 104 contact the abutment surface 98 and move the bearing block 70 until the slack in the endless conveyor belt 4 is taken up and a proper tension is placed thereon. The set screws 94 are then tightened to prevent further movement of the externally threaded bolts 110. The one or more belleville disc springs 104 will function as shock absorbers at start-up as described above.

While illustrative and presently preferred embodiments of the invention have been described in detail herein, it is to be understood that the inventive concepts may be otherwise variously embodied and employed and that the appended claims are intended to be construed to include such variations except insofar as limited by the prior art.

What is claimed is:

1. Apparatus for conveying articles comprising:
   a fixed frame;
   at least a pair of spaced apart rotatable shafts mounted on said frame and having an endless conveyor belt trained therearound;
   drive means for rotating at least one of said resilient shafts to move said endless conveyor belt;
   bearing means mounted on said frame and rotatably supporting each of said shafts;
   mounting means for mounting at least one of said bearing means for sliding movement relative to said frame;
   resilient force applying means for applying a resilient force on said mounting means to maintain the proper tension in said endless conveyor belt; and
   shock absorbing means parallel to and independent of said force applying means for only absorbing excessive forces placed on said resilient force applying means.

2. The invention as in claim 1 and further comprising:
   said shock absorbing means mounted on said resilient force applying means for permitting relative movement therebetween.

3. The invention as in claim 2 wherein said shock absorbing means comprises:
   at least one belleville spring located to be contacted by said mounting means.

4. The invention as in claim 2 wherein:
   said endless conveyor belt is a power turn having an arcuate outer portion and arcuate inner portion.

5. The invention as in claim 1 wherein said resilient force applying means comprises:
   at least one body portion mounted on said fixed frame to prevent relative movement therebetween;
   a plunger slidably mounted in said at least one body portion;
   resilient means for urging said plunger out of said at least one body portion;
   said plunger having an end portion; and
   said at least one body portion being located so that said end portion contacts said mounting means to urge said mounting means away from said at least one body portion.

6. The invention as in claim 5 and further comprising:
   said shock absorbing means mounted on said resilient force applying means for permitting relative movement therebetween;
   said shock absorbing means located between an end surface of said at least one body portion and said mounting means; and
   said shock absorbing means having an axial extent less than the distance between said end surface and said mounting means.

7. The invention as in claim 6 wherein said shock absorbing means comprises:
   at least one belleville spring mounted on said plunger and located between said end portion and said at least one body portion.

8. The invention as in claim 6 and further comprising:
   adjustment means for adjusting the location of said at least one body portion relative to said fixed frame.

9. The invention as in claim 1 wherein said mounting means comprises:
   at least one bearing slide mounted at a fixed location on said fixed frame;
   a bearing block for holding said at least one of said bearing means; and
   guide and support surfaces on said bearing block to support and guide said bearing block for sliding movement over said at least one bearing slide.

10. The invention as in claim 1 wherein said mounting means comprises:
    a bearing support plate mounted on said fixed frame;
    at least a pair of spaced apart bearing slides mounted at fixed locations on said bearing support plate and spaced outwardly therefrom;
    a bearing block for holding said at least one of said bearing means;
    at least one support surface on said bearing block for supporting said bearing block for sliding movement over at least one of said bearing slides; and
    spaced apart guide surfaces on said bearing block for cooperation with said bearing slide for guiding the movement of said bearing block over said at least one of said bearing slides.

11. The invention as in claim 1 wherein said resilient force applying means comprises:
    a bearing support plate mounted on said fixed frame;
    a support base mounted on said bearing support plate;
    said support base having at least a pair of spaced apart openings extending therethrough in parallel relationship;
    a body portion mounted in each of said at least a pair of spaced apart openings;
    a plunger slidably mounted in each of said body portions;
    resilient means for urging each of said plungers out of each of said body portions;
    each of said plungers having an end portion; and
    said body portions being located so that said end portions contact said mounting means to urge said mounting means away from said body portions.

12. The invention as in claim 11 and further comprising:
    said shock absorbing means mounted on each of said plungers for permitting relative movement therebetween.

13. The invention as in claim 12 wherein said shock absorbing means comprises:
    at least one belleville spring mounted on each of said plungers and located between said end portions and said body portion; and
    said at least one belleville spring having an axial extent less than the distance between an end surface of said body portion and said mounting means.

14. The invention as in claim 13 and further comprising:

each of said belleville springs having a central opening having a cross-sectional configuration that is larger than the cross-sectional configuration of each of said plungers to permit said relative movement between said belleville springs and said plungers.

15. The invention as in claim 12 and further comprising:
adjustment means for adjusting the location of each of said body portions relative to said fixed frame.

16. Apparatus for conveying articles comprising:
a fixed frame;
at least a pair of spaced apart rotatable shafts mounted on said frame and having an endless conveyor belt trained therearound;
drive means for rotating at least one of said rotatable shafts to move said endless conveyor belt;
bearing means for rotatably supporting each of said rotatable shafts;
bearing support means mounted at a fixed location on said frame for supporting at least one of said bearing means;
mounting means for mounting said at least one of said bearing means for sliding movement relative to said bearing support means;
shock absorbing means located between said mounting means and said bearing support means for absorbing excessive forces placed on said bearing support means during start up;
a bracket mounted at a fixed location on said bearing support means;
said bracket having at least one threaded opening therein;
a threaded bolt threadably mounted in said threaded opening and having a force applying end;
said shock absorbing means comprising at least one belleville spring secured to said force applying end and in contact with said mounting means; and
rotating means for rotating said threaded bolt to remove the slack from said endless conveyor belt.

17. The invention as in claim 16 wherein:
said bracket having at least a pair of spaced apart threaded openings located therein and having parallel longitudinal axes;
a threaded bolt threadably mounted in each of said openings and having a force applying end;
said shock absorbing means comprising at least one belleville spring mounted on each of said force applying ends and in contact with said mounting means; and
rotating means for rotating said threaded bolts to remove the slack from said endless conveyor belt.

* * * * *